Nov. 17, 1964  C. F. MORAIN  3,157,549
METHODS OF PROTECTING LENGTHS OF METAL PIPE
Filed Oct. 30, 1961

INVENTOR
CLIFFORD F. MORAIN

BY *Francis J. Klempay*
ATTORNEY

United States Patent Office 3,157,549
Patented Nov. 17, 1964

3,157,549
METHODS OF PROTECTING LENGTHS OF METAL PIPE
Clifford F. Morain, Burgett Road, Youngstown, Ohio
Filed Oct. 30, 1961, Ser. No. 148,764
5 Claims. (Cl. 156—253)

This invention relates to methods and supplies for protecting lengths of metal pipe in an improved yet simplified manner and in which the resultant product possesses advantages as regards protection and use. It is very common practice in the metal pipe manufacture and utilization fields to apply various protective coatings and wrappings to keep the metal of the pipe from rusting during storage and during its tenure in a pipe line, for example. Usually an adhesive asphaltic coating is applied onto the outer surface of the metal pipe immediately after cleaning, and immediately after application of this coating material the pipe is wrapped with heavy paper.

To minimize the cost of the above outlined coating and wrapping process it is common practice to interconnect successive pipe lengths by means of interconnecting plugs into a continuous length which is fed into a coating and wrapping machine where the outer surface of the continuous length is first coated and then wrapped—the process being carried on substantially in a continuous manner with the continuous length being rotated as it is advanced longitudinally and with the protective heavy paper wrap being applied spirally as will be understood by those skilled in the art. In this process the adhesive asphaltic coating and the paper wrap continues to and beyond the ends of the pipe length and remains so even after the pipe lengths are reseparated for shipment and storage. This fact creates serious difficulties in the field when the pipe lengths are to be permanently connected end-to-end in a pipe line, for example, particularly if the pipe is threaded since it is difficult to remove the wrap and coating from the threads and to thereafter clean the threads. If the pipe is to be welded in end-to-end relation or if fittings are to be welded or placed on to the end portions of the pipe lengths similar difficulties are encountered since it is necessary to remove the wrap and coating from the points of weld and since the asphalt contaminates and interferes with the welding process.

The primary object of the present invention is to provide improved methods for protecting pipe lengths wherein the above outlined advantageous procedure for coating and wrapping the pipe may be retained while yet in the field the end portions of the pipe lengths may be readily and easily bared to expose the bright clean metal of the threads or bright clean metal of the end faces of the pipe and of the outer cylindrical surfaces thereof adjacent said end faces. A further object of the invention is the provision of disposable protecting sleeves having particular utility in the methods of my invention to accomplish the primary objects set out.

The above and other objects and advantages of the invention will become apparent upon consideration of the following specification and the accompanying drawing wherein there is disclosed preferred embodiments of my invention.

Figure 2:
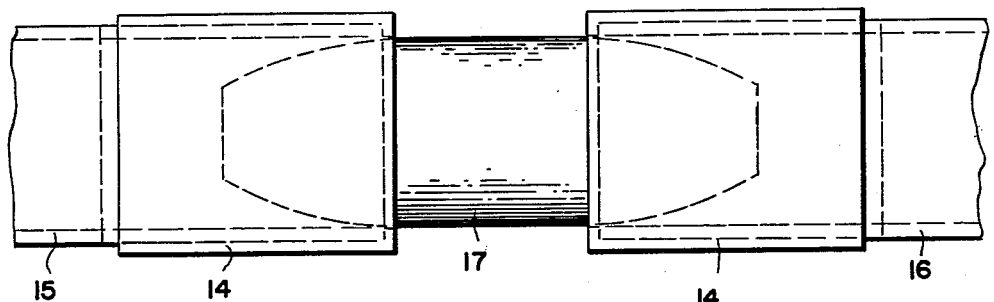
FIGURE 2 is a plan view of interconnected end portions of two pipe lengths with protective sleeves of the invention in proper position prior to entering the coating and wrapping line of FIGURE 1.
Figure 1:
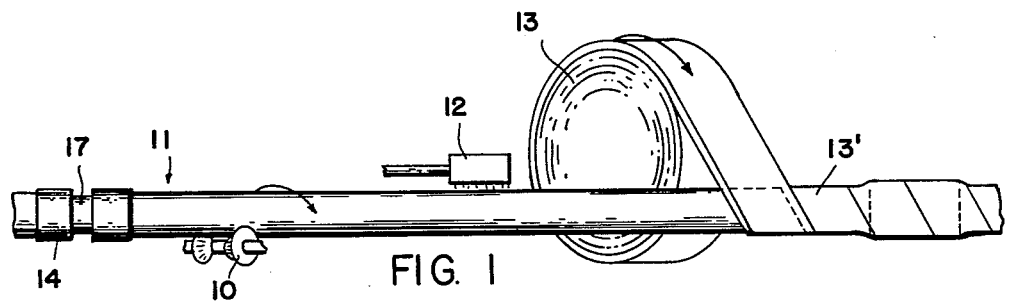
FIGURE 1 is a schematic showing of a conventional pipe coating and wrapping line which may be used in carrying out my invention.

In FIGURE 1 of the drawing there is schematically shown at 10 a driven skewed hourglass roll which supports and propels longitudinally a continuous pipe assembly 11 while simultaneously rotating the assembly about its longitudinal axis. Means is shown schematically at 12 to apply a coating material, preferably an adhesive asphaltic material, to the outer surface of the continuous pipe assembly and in actual practice, of course, suitable means not shown herein, is employed to wipe and evenly distribute the coating material over the outer surface of the pipe assembly. Likewise, additional means, not shown, is provided to support, propel and rotate the pipe assembly. After application of the coating material the pipe assembly is spirally wrapped with heavy paper from a coil thereof shown at 13 and in the manner suggested in the drawing.

Figure 3:
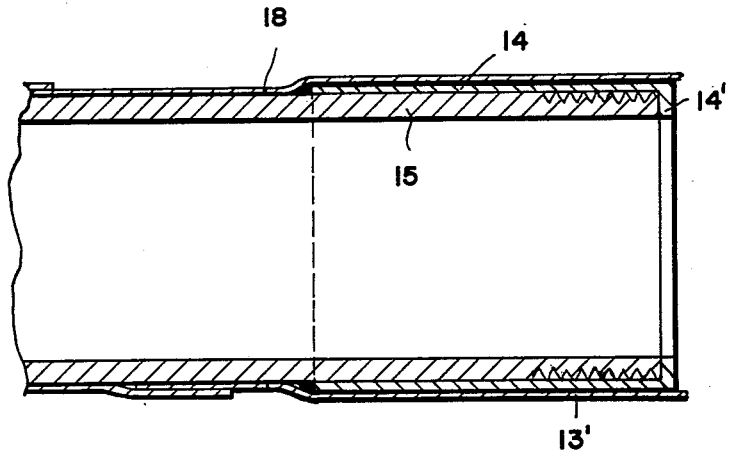
FIGURE 3 is a fragmentary longitudinal section of a pipe length coated and wrapped in accordance with my invention and prepared for storage and/or delivery to the field of use.

To prepare the above mentioned continuous pipe assembly for the coating and wrapping line and to carry out the principles of my invention I apply to each end of each discrete pipe length to be worked on a protective sleeve 14 which may be suitably fashioned of pulp or paper by molding or winding on a mandrel as will be understood by those skilled in such manufacture. In the drawing, two of the pipe lengths to be worked on are designated by the reference numerals 15 and 16, and it will be understood that the protective sleeves 14 are manufactured with an internal diameter to snugly fit over the external surface of the pipe lengths 15 and 16 to which they are to be applied. The sleeves are applied simply by being slipped over the end portions of the pipe lengths and, as shown, the sleeves are of such length as to extend inwardly beyond any pipe threads which may be conventionally formed on the end portions of the pipe lengths or inwardly beyond any area normally required for the welding of the pipe lengths in end-to-end relation or for the welding of fittings. Sleeves 14 are further preferably provided at one of their ends with an inwardly directed flange 14' which, when the sleeves are applied to the pipe lengths, overlie the end faces of the pipe lengths as shown in FIGURE 3.

After application of the sleeves 14 in the manner recited above successive pipe lengths are joined in end-to-end relation by means of the plugs 17 which are preferably tapered at their ends for ease of insertion in the successive pipe lengths and to form a fairly tight joint so that adjacent pipe lengths will not rotate with respect to each other during travel of the resultant continuous pipe assembly 11 through the coating and wrapping equipment. It will be understood that during normal operations the coating and wrapping equipment will run uninterruptedly during the paying off of paper from any one coil 13, and during such operation the successive pipe lengths will be joined to the tail end of the continuous pipe assembly 11 as needed.

As apparent from FIGURE 1, all of the exposed surface of the continuous pipe length 11 is subjected to the coating and wrapping procedure so that this step may be carried out at minimum cost. After the continuous pipe length issues from the coating and wrapping equipment the paper wrapping, indicated by reference numeral 13' is annularly cut outwardly of the flanges 14' of each of the sleeves 14 so that the most advanced pipe length may be grasped and separated from the leading end of the continuous pipe assembly 11. These operations may be accomplished either manually or automatically, depending on the complexity of the plant, but in either case the separation is accomplished in such manner that the paper wrapping 13' on the sleeves 14 is not unduly disturbed, and in such manner also that the plugs 17 may be readily removed and returned back for further use at the head of the line.

Upon separation of the coated and wrapped pipe lengths from the head of the continuous pipe assembly 11 in the manner described above the separated pipe lengths with the protective sleeves 14 applied are ready for transportation and/or storage. Upon being delivered to the point of use and shortly before being permanently connected with the threads provided, or by welding, the protective sleeves 14 may be readily removed by annularly cutting or severing the wrap 13' immediately inward of the inner ends of the sleeves 14. Since there is no adhesive coating material between the sleeves 14 and any outer surface of the pipe lengths the sleeves 14 and the wrap bonded thereon may be removed as a unit by a simple twisting action. When so removed the metal on the end face of the pipe length and on the outer cylindrical surface of the pipe length adjacent its end is bright and clean and is immediately available for joining by welding or threading. To facilitate the removal of the coated and wrap protecting sleeves in the field I may, simultaneously with severing the wrap intermediate two of the adjacent flanges 14', annularly score the wrap closely adjacent the inner ends of the sleeves 14. In FIGURE 3 of the drawing one such annular score line is shown at 18, and it should be obvious that since there is no adherence between the inner surfaces of the sleeves 14 and the pipe lengths that a twistnig force applied to the wrapped sleeves will readily break away the adherence between the wrap and the pipe length outwardly of the score line 18 to effect a clean break or separation.

It should now be apparent that I have provided improved methods and supplies for protecting pipe lengths which accomplishes the objects initially set out. The protective sleeves 14, which are of the essence of the invention, can be most economically produced and are very readily applied to the pipe lengths without appreciable cost prior to the pipe lengths being fed into the coating and wrapping equipment. These sleeves not only protect the end faces of the pipe lengths against the weather but also lend additional protection against the weather to the threads, if the pipe is threaded, and to the metal itself if the pipe is to be welded. Further, the sleeve 14 provide additional effective protection against damage to the threads, edges or end portions of the pipe as may be caused by impact loads imposed during handling of the pipe lengths. The most important advantage of the invention is, however, that threads or the metal of the end portions of the pipe is kept clean and is very readily bared for joining together or with fittings.

While I have specifically described and illustrated my process as being applied in the protection of pipe and wrapping as well as coating, it should be understood and obvious that the method is equally applicable in pipe protective processes where coating only is employed, such as a plastic type coating which may be either sprayed or extrued onto the pipe. Likewise, while I have specifically referred to the sleeves 14 as being suitably fashioned of pulp or paper, it should be understood that these may be made of other suitable materials, such as various plastic materials by molding or other methods. Therefore, since many changes may be made in the application of my invention to the preparation of protected pipe lengths, reference should be had to the appended claims in determining the scope of my invention.

I claim:

1. The method of protecting metal pipe which consists of placing over each end portion of discrete lengths of the pipe a protective sleeve, forming a continuous length of the pipe by interconnecting said lengths with said sleeves so applied thereon by means of plugs entering into said end portions, passing said continuous length through pipe coating apparatus to thereby apply a coating to said continuous length, cutting the coating annularly about the plugs but outwardly of the outer end of each sleeve and thereafter separating the discrete coated lengths with said sleeves encased by and retained by said coating, and scoring said coating annularly adjacent to but inwardly of each of said sleeves whereby at the time of permanent connection of said lengths in end-to-end relation in the field said sleeves and coating thereon may be readily twisted off the end portions of the pipe lengths to expose clean metal.

2. The method of protecting metal pipe which consists of placing over each end portion of discrete lengths of the pipe a protective sleeve, forming a continuous length of the pipe by positioning said discrete lengths with said sleeves so applied thereon in general end-to-end relation, passing said continuous length through pipe coating and wrapping apparatus to thereby apply a coating and an overlaid wrapping to said continuous length, cutting the coating and wrapping annularly between the outer ends of adjacent sleeves to thus separate said discrete lengths, and scoring said coating and wrapping annularly adjacent to but inwardly of each of said sleeves whereby at the time of permanent connection of said lengths in end-to-end relation in the field said sleeves and overwrap thereon may be readily twisted off the end portions of the pipe lengths to expose clean metal.

3. The method of protecting metal pipe which consists of placing over each end portion of discrete lengths of the pipe a protective sleeve, forming a continuous length of the pipe by interconnecting said lengths with said sleeves so applied thereon by means of plugs entering into said end portions, passing said continuous length through pipe coating and wrapping apparatus to thereby apply a coating and an overlaid wrapping to said continuous length, and longitudinally separating said continuous length at points intermediate said sleeves into said discrete lengths each now having a coating and wrap layer intermediate its ends and a coating and wrap layer overlying said sleeves at its end portions.

4. The method of protecting metal pipe which consists of placing over each portion of discrete lengths of the pipe a protective sleeve, forming a continuous length of the pipe by positioning said discrete lengths with said sleeves so applied thereon in general end-to-end relation, passing said continuous length through pipe coating and wrapping apparatus to thereby apply a coating and an overlaid wrapping to said continuous length, and longitudinally separating said continuous length at points intermediate said sleeves into said discrete lengths each now having a coating and wrap layer intermediate its ends and a coating and wrap layer overlying said sleeves at its end portions.

5. The method of protecting metal pipe which consists of placing over each portion of discrete lengths of the pipe a protective sleeve, forming a continuous length of the pipe by positioning said discrete lengths with said sleeves so applied thereon in general end-to-end relation, passing said continuous length through pipe coating apparatus to apply a coating to said continuous length, and longitudinally separating said continuous length at points intermediate said sleeves into said discrete lengths each now having a coating layer intermediate its ends and a coating layer overlying said sleeves at its end portions.

References Cited in the file of this patent

UNITED STATES PATENTS

| | | |
|---|---|---|
| 1,165,427 | McIlroy | Dec. 28, 1915 |
| 1,291,577 | McIlroy | Jan. 14, 1919 |
| 2,161,036 | Gremmel et al. | June 6, 1939 |
| 2,828,798 | Hopkins et al. | Apr. 1, 1958 |